United States Patent [19]

Leaming

[11] 4,158,871
[45] * Jun. 19, 1979

[54] KIT FOR SERVICING TAPE CARTRIDGE PLAYBACK UNIT

[76] Inventor: Raymond C. Leaming, 721 S. Washington, Liberal, Kans. 67901

[*] Notice: The portion of the term of this patent subsequent to Dec. 27, 1994, has been disclaimed.

[21] Appl. No.: 862,919

[22] Filed: Dec. 21, 1977

Related U.S. Application Data

[63] Continuation-in-part of Ser. No. 609,009, Aug. 29, 1975, Pat. No. 4,065,801.

[51] Int. Cl.² .......................... G11B 5/41; A47L 25/00
[52] U.S. Cl. ........................................ 360/137; 15/32; 360/132
[58] Field of Search ................. 360/137, 132, 128, 93; 15/246, 257, 100, 145, 159 R, 23

[56] References Cited

U.S. PATENT DOCUMENTS

| | | | |
|---|---|---|---|
| B 449,892 | 3/1976 | Thompson | 360/132 |
| 3,407,431 | 10/1968 | Melnik | 15/32 |
| 3,761,994 | 10/1973 | Becht | 360/128 |
| 3,881,195 | 4/1975 | Ono | 360/128 |
| 3,955,214 | 5/1976 | Post et al. | 360/137 |

OTHER PUBLICATIONS

Admiral Tape Player, #846, Chassis Service Manual, (5-74), p. 5.

Primary Examiner—Jay P. Lucas
Attorney, Agent, or Firm—Berman, Aisenberg & Platt

[57] ABSTRACT

A kit for servicing the interior working parts of a cartridge type tape playback unit comprising a completely hollow cartridge case having parallel track guide means disposed in its two sides. The hollow cartridge case is designed to actuate the unit when it is inserted in the unit and provide the user of the kit with an unobstructed view of the playback head, the capstan and the sensing poles as well as other similarly disposed interior working parts over which the tape would normally travel. A tool holder having a plurality of interchangeable service heads is provided. Two of the heads, one of abrasive material and the other of felt or the like, are formed with a concave cleaning surface and are dimensioned so as to be received between the guides in the side walls of the cartridge case. Another cleaning head includes cutter blades and a magnet and is also sized so as to be received within the guides. The guides are aligned with the capstan so as to direct these heads into intimate contact with the capstan surface. Another service head is formed as a swab of cotton-like material and is designed for cleaning the sensing poles and playback head. A still further service head is formed as a transparent plate having indicia positioned thereon for checking the alignment of the playback head, while yet another service head is formed as a metal probe for shunting the sensing probes to check proper operation thereof.

39 Claims, 21 Drawing Figures

KIT FOR SERVICING TAPE CARTRIDGE PLAYBACK UNIT

CROSS-REFERENCE TO RELATED APPLICATION

This application is a continuation-in-part of U.S. Application Ser. No. 609,009, filed Aug. 29, 1975 now U.S. Pat. No. 4,065,801, issued Dec. 27, 1977.

BACKGROUND OF THE INVENTION

1. Field of The Invention

The present invention relates to servicing various components of a magnetic tape player of the cartridge type and more particularly relates to a kit for effecting cleaning, testing and alignment of the player components.

2. Description of The Prior Art

Recently, the use of cartridge-type prerecorded tapes, and particularly those of the 8-track variety, has become extremely widespread. Along with the convenience and pleasure which these cartridges provide, have come problems which are peculiar to the construction of the playback units.

The playback units of the cartridge-type include playback heads and related structures which are normally mounted in an enclosed location, since the cartridges are positioned for playing by being inserted in a slot-like aperture. It has been found that the playback head, the drive capstan, the sensing poles utilized for switching tracks in an 8-track tape and other related components of the playback unit, which contact the moving tape or which are immediately adjacent to the moving tape, tend to accumulate deposits of Mylar or other tape coating oxides after the devices have been in use over an extended period of time. Small bits and pieces of the magnetic tape itself can also adhere to these components. Such accumulations on the playback head give rise to noise and distortion as the tape is played back. Further, the deposits on the drive capstan often result in slippage of the tape, causing wow and flutter as the tape is being played back, since the playback speed will not be constant.

In addition to the clear need for servicing these components by cleaning same, certain tests or checks should also be performed at regular intervals to ensure that the playback unit is functioning properly. For example, it is very important that the tape playback head be maintained in proper alignment, both with respect to azimuth (angle) and height, since a misaligned head can cause crosstalk between adjacent tracks on the tape. Proper operation of the sensing poles is also important, since they are utilized to automatically shift the playback head from one tape track to another when they are shorted by a small metal strip at the end of the tape.

In the past, servicing of the tape playback head, the drive capstan and the sensing poles, as well as the other related components of the playback unit, required the laborious disassembly of the entire unit in order to gain access to these various parts. Such a procedure was obviously unsatisfactory from an economic standpoint, since it required the services of a skilled maintanance person and was extremely time-consuming.

Certain solutions to the cleaning problem have been proposed. For example, one of the more common commercially available cleaning devices involves a cartridge having a cleaning tape coated with an abrasive material, substituted for the ordinary magnetic tape. This type of device has proven to be unsatisfactory in many respects among which are the undue wear which it causes on the playback head, the limited area of the drive capstan which it is able to clean, the wear on the drive capstan, and the build-up of foreign material which it causes on either side of the cleaning tape. Other cleaning devices of various sorts have also been proposed, but none of these has been entirely successful.

I am aware of the following patents, which are not necessarily prior art with respect to my invention, in this general area: U.S. Pat. Nos. 3,407,431, Melnick, 1968; 3,439,922, Howard, 1969; 3,594,850, Wellington, 1971; 3,647,990, Eul, 1972; 3,701,178, Kuntz, 1972; 3,761,994, Becht, 1973; 3,881,195, Ono, 1975; 3,955,214, Post, 1976; 3,997,919, Thompson, 1976.

SUMMARY OF THE INVENTION

In accordance with the present invention, there is provided a kit for servicing the interior working parts of a cartridge-type tape playback unit which includes a hollow tape cartridge designed to be inserted in the normal tape cartridge receiving slot of the playback unit and to actuate the machine. Also included in the kit are a tool holder having a plurality of interchangeable service heads. Three of the heads are designed so as to specifically adapt them for cleaning the drive capstan while another head is of a more generalized type, preferably taking the form of a cotton swab, and being useful for cleaning the playback head and the sensing poles. Yet another service head is provided for facilitating the checking of the alignment of the tape playback head, while a further service head is designed to test for proper operation of the sensing poles in shifting the playback head from track to track.

Disposed on the inner side walls of the hollow cartridge are parallel trackways in alignment with the capstan. These trackways serve as a guide for the insertion of the capstan cleaning heads so that the user of the kit does not have to visually align the tool with the capstan, as well as a precision support for one end of the alignment service head. The front portion of the cartridge is completely open while the back portion of the cartridge contains cut-out portions surrounding respectively the capstan, the playback head and the sensing poles, to permit ready access to these components when the cartridge is inserted in place. In addition to providing access to the components for cleaning, testing, alignment and other general servicing purposes, the completely hollow cartridge of the present invention permits the user of the kit to visually observe any signs of wear or malfunction of the head, drive capstan or other components. Additionally, the drive capstan may be observed throughout its entire circumferential extent as it rotates, thus permitting the user of the kit to thoroughly clean this component, which would not be the case if the capstan were only observed at rest in a single position with a portion of its surface hidden from view.

Thus, it is a principal object of the present invention to provide a kit for servicing tape player components.

It is a further object of the present invention to provide a hollow cartridge for insertion in the tape player to create an unobstructed view of the working components of the player.

A still further object of the present invention is to provide a kit for cleaning, testing, aligning and other general servicing of tape player components which includes a tool holder having a series of interchangeable service heads, each adapted to perform a separate and distinct service function.

Yet another object of the present invention is to provide a hollow cartridge insertable in a tape player and having guide means aligned with the drive capstan to permit accurate positioning of a cleaning tool to clean the capstan as well as of an alignment tool for checking playback head alignment.

An additional object of the present invention is to provide a tape player servicing kit which permits alignment of the playback head to be checked, proper operation of the sensing poles to be tested, and cleaning of all exposed components to be effected without requiring dismantling of the entire unit, thereby substantially reducing the time required to service the unit as well as the necessity and expense of a skilled serviceman.

BRIEF DESCRIPTION OF THE DRAWINGS

Various objects, aspects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
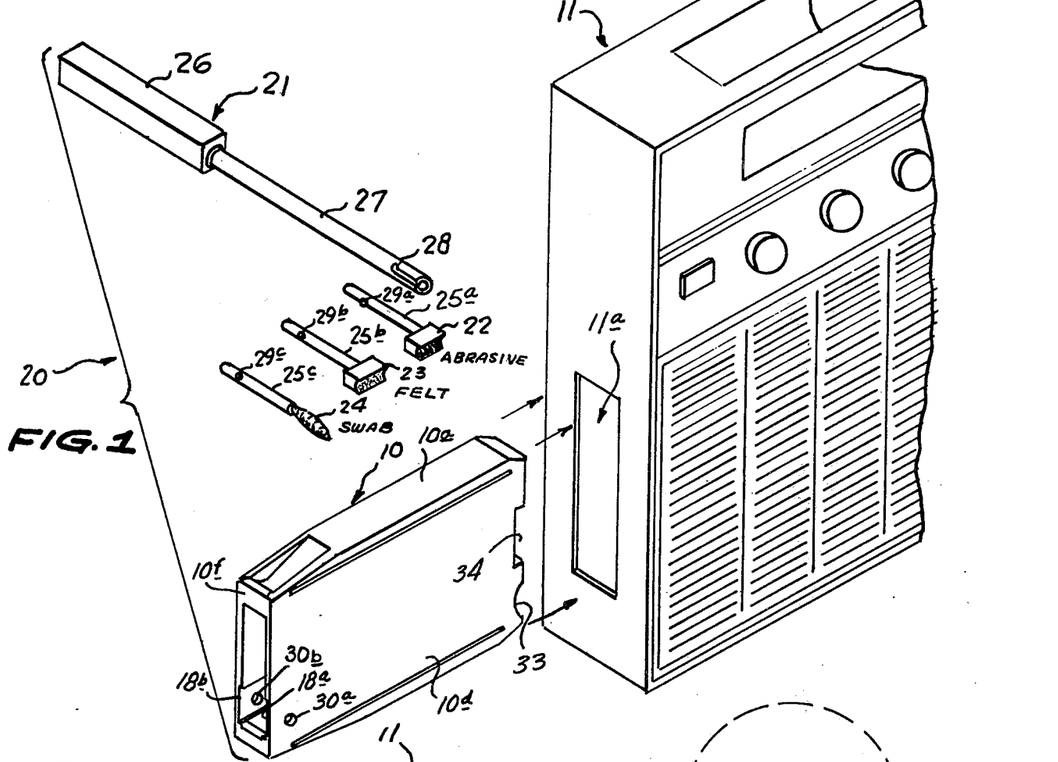
FIG. 1 is a perspective view of some of the components of a preferred embodiment of the kit of the present invention and indicating the manner in which the hollow cartridge is inserted in a tape playback unit.

Referring now to the drawings and in particular to FIG. 1, there is shown a portion of a conventional 8-track playback unit 11 having an opening 11a therein for normally receiving an 8-track cartridge. Certain of the elements of the kit of the present invention for servicing the components of the playback unit are generally designated by the reference numeral 20.

The elements 20 of the kit include a hollow cartridge 10, formed of plastic or the like, and which may be conveniently made by removing the inner parts of a conventional 8-track cartridge tape. The hollow cartridge case 10 includes an upper wall 10a, a bottom wall 10b, a rear wall 10c, a front wall 10f and side walls 10d and 10e. Apertures 30a and 30b are provided in side walls 10d and 10e respectively for a purpose which will appear more fully hereinbelow. The conventional cartridge case 10 is modified by providing parallel trackways 18a and 18b on the interior sides of side walls 10d and 10e, respectively, for a purpose which will be explained more fully hereinbelow.

Provided with the kit of the present invention is a tool holder 21 having a handle portion 26 and a shaft 27 which may have, for example, a bayonet slot 28 in its end for lockingly receiving a plurality of interchangeable service heads, such as cleaning heads 22, 23 and 24. Cleaning head 22 has a concave abrasive surface for mating with a drive capstan, cleaning head 23 has a concave felt surface for cleaning the drive capstan while cleaning head 24 takes the form of a cotton swab or the like. In the illustrated embodiment, cleaning heads 22, 23 and 24 are respectively provided with shafts 25a, 25b and 25c having projections 29a, 29b and 29c thereon for lockingly engaging bayonet slot 28 of tool holder 21.

Figures 3, 4, 5, 7, 8:
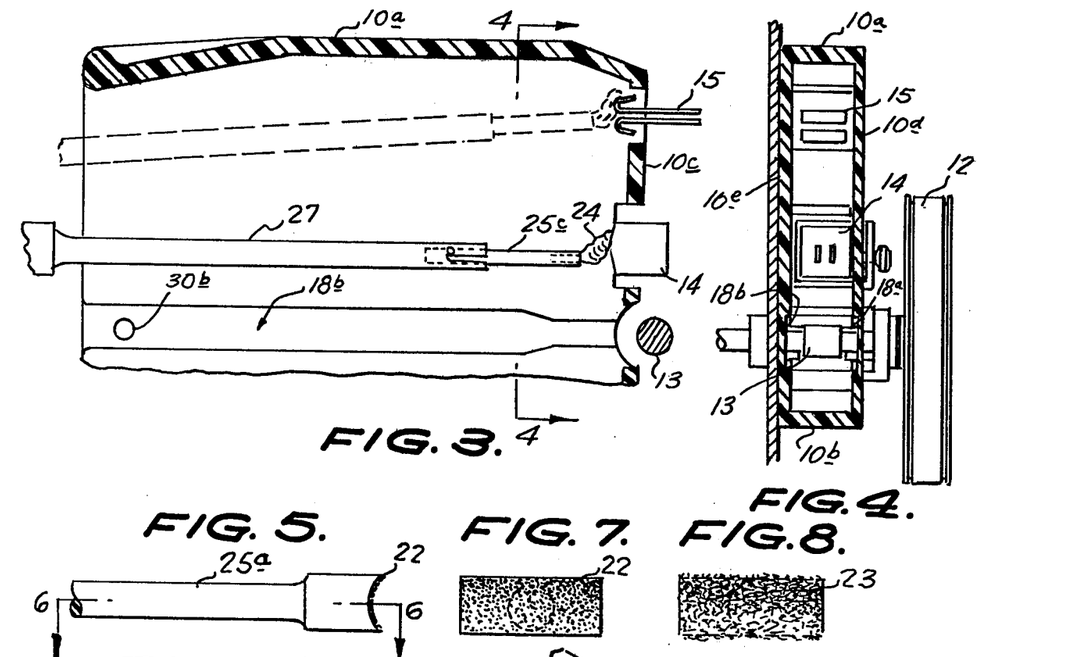
FIG. 3 is a sectional view similar to FIG. 2 but indicating the manner in which the mounting tool and associated service head may be positioned to clean other components of the playback unit.
FIG. 4 is a sectional view taken along line 4—4 of FIG. 3 looking in the direction of the arrows.
FIG. 5 is a partial side elevation showing one of the service heads used for cleaning the drive capstan.
FIG. 7 is a plan view of one of the interchangeable service heads for cleaning the drive capstan.
FIG. 8 is a plan view of another interchangeable service head for cleaning the drive capstan.
Figures 6, 9, 10:
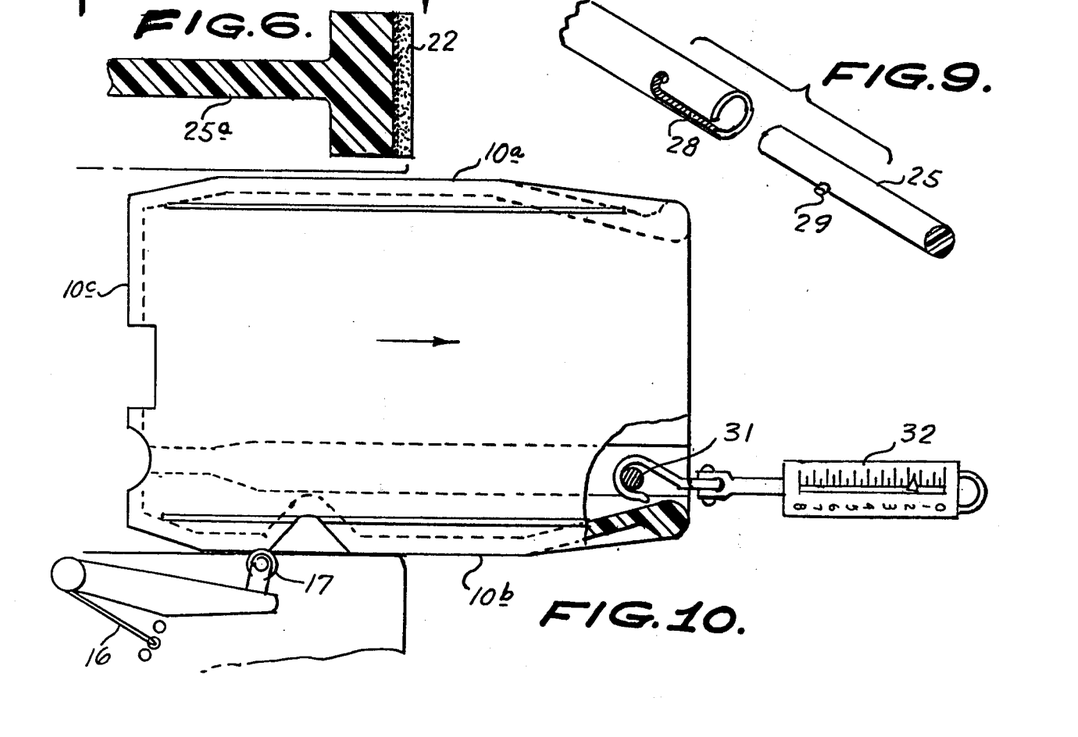
FIG. 6 is a sectional view taken along line 6—6 of FIG. 5 looking in the direction of the arrows.
FIG. 9 is a partial perspective view of one manner in which the interchangeable heads may engage with the tool holder.
FIG. 10 illustrates an auxiliary feature of the present invention whereby the tension on the cartridge may be measured.

Turning to FIGS. 5, 6, 7, 8 and 9, the above-described features of the tool holder and interchangeable cleaning heads shown in FIG. 1 may be more readily observed. As seen in FIG. 5, the concave abrasive surface 22, which is used for honing the capstan 13, is designed to mate closely with the surface of the capstan and may be conveniently formed by providing a plastic base with a thin strip of abrasive material such as 500 grit emery cloth. This construction may be seen in the cross-sectional view of FIG. 6. FIG. 7 illustrates the abrasive surface of cleaning head 22 while FIG. 8 illustrates the felt or similar material which may be applied to a plastic base or the like, comprising the cleaning head 23. As shown in FIG. 9 in general form, any one of the projections 29 is designed to mate with bayonet slot 28 by sliding movement thereinto and twisting the shaft 25, in a well-known manner.

Figure 14:
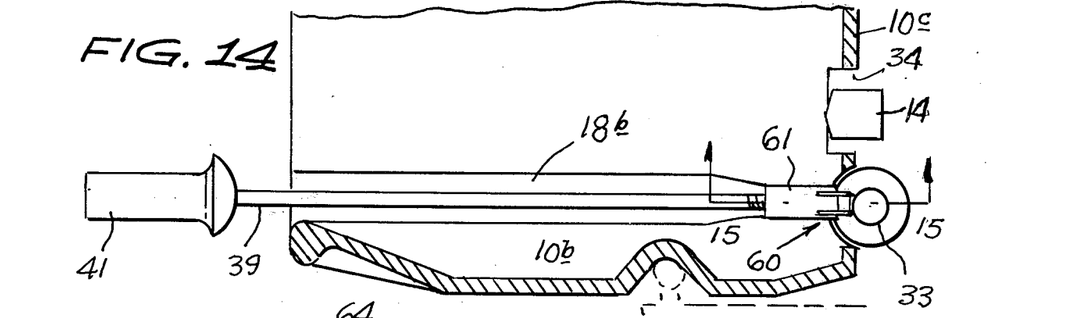
FIG. 14 is a side partial sectional view illustrating yet another alternative embodiment of a service head utilized to clean the drive capstan of the playback unit.
Figure 15:
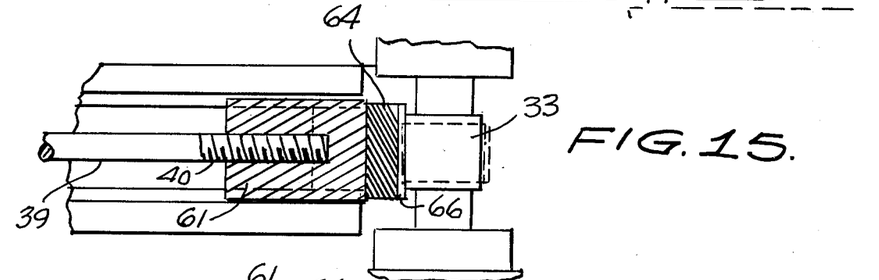
FIG. 15 is an enlarged, partially sectional view of the service head of FIG. 14 and taken along line 15—15 thereof looking in the direction of the arrows.
Figure 16:
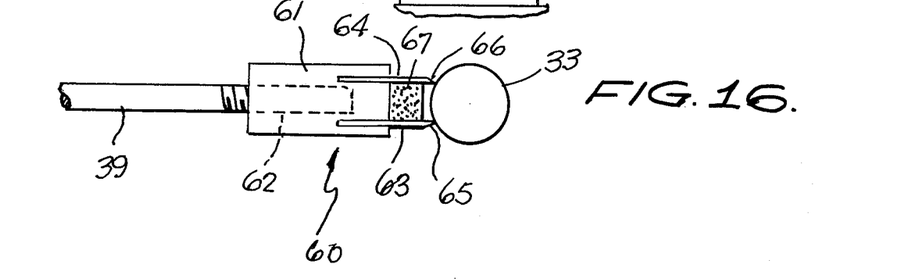
FIG. 16 is an enlarged side elevation of the cutting service head illustrated in FIG. 14 in somewhat greater detail.

Referring now to FIGS. 14, 15 and 16, an additional capstan cleaning head is illustrated and is indicated generally by reference numeral 60. Cleaning head 60 comprises a cutter probe which includes a pair of substantially flat, parallel blades 63 and 64 which are designed to remove any broken magnetic tape which may become adhered to the outer surface of the capstan 33. The blades 63 and 64 include a pair of forwardly disposed cutting edges 65 and 66 which extend in a direction parallel to the rotational axis of capstan 33. The blades 63 and 64 are mounted in a base support 61, and preferably have disposed therebetween a magnet 67 for picking up any magnetic tape shavings removed from the capstan 33. Base 61 is sized as are heads 22 and 23 so as to be guidingly received within trackways 18a and 18b of cartridge case 10. As an alternate embodiment to the bayonet slot mounting illustrated in FIG. 9, the base support 61 may include a tapped bore 62 for receiving a threaded end 40 of a shaft 39 having a handle 41 connected to the distal end thereof.

Figures 20, 21:
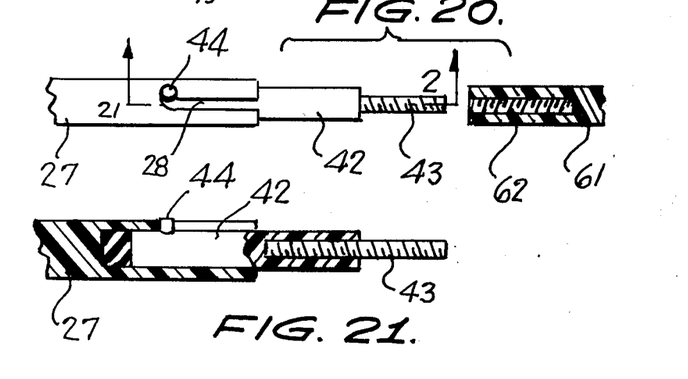
FIG. 20 is an exploded, partial side, partial sectional view of an adapter which may be utilized in conjunction with the present invention.
FIG. 21 is a sectional view of the adapter illustrated in FIG. 20 and taken along line 21—21 thereof looking in the direction of the arrows.

As illustrated in FIGS. 20 and 21, an adapter 42 may be provided so as to permit the cutter head 60 to be mounted onto the tool holder 21, is so desired. Adapter 42 includes a threaded shaft 43 extending from one end thereof and adapted to threadingly receive the tapped bore 62 of base support 61. Extending from the other end of adapter 42 is a projection 44 for fitting within the bayonet slot 28 of the shaft 27 of tool holder 21 of FIG. 1. In this manner, it may be appreciated that the several different service head designs may be interchanged with the several different tool holder means described and set forth, although it is clear that the invention is not so limited and other constructions will suggest themselves to a person of ordinary skill in the art.

Figures 11, 12, 13:
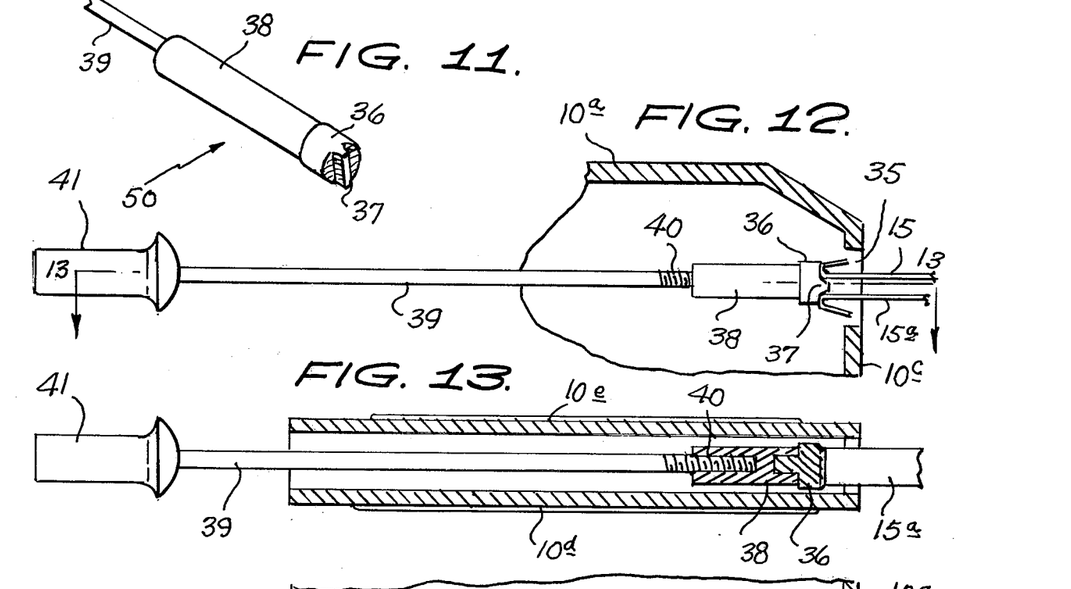
FIG. 11 is a perspective view of yet another service head utilized for checking the proper operation of the sensing poles.
FIG. 12 is a partial side sectional view illustrating the manner in which the service head of FIG. 11 may be positioned to test the operation of the sensing poles.
FIG. 13 is a partial sectional view of the components illustrated in FIG. 12 and taken along line 13—13 of FIG. 12 looking in the direction of the arrows.

Referring now to FIG. 11, a program changing probe is indicated generally by reference numeral 50 and is adapted to shunt or short out the sensing poles 15 and 15a to permit testing of the proper operation thereof. Probe 50 includes a support base 38 having a tapped bore in one end thereof for receiving the threaded end 40 of shaft 39 of the tool holder. On the other end of base 38 is mounted a metal tip 36 which preferably includes a raised central portion 37 for fitting between the adjacent sensing poles 15 and 15a to thereby electrically short same.

Figure 17:
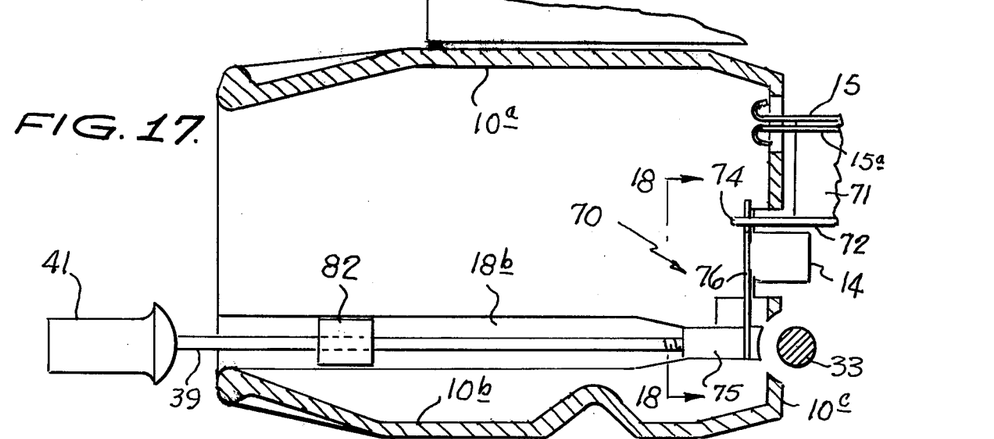
FIG. 17 is a side sectional view illustrating a preferred embodiment of a service head utilized for checking the alignment of the playback head.
Figure 18:
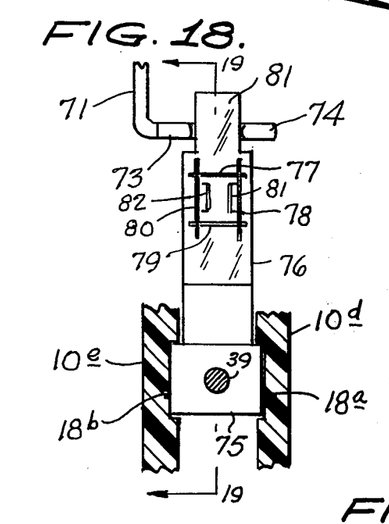
FIG. 18 is an enlarged, partial sectional view of the alignment service head of FIG. 17 and taken along line 18—18 thereof looking in the direction of the arrows.
Figure 19:
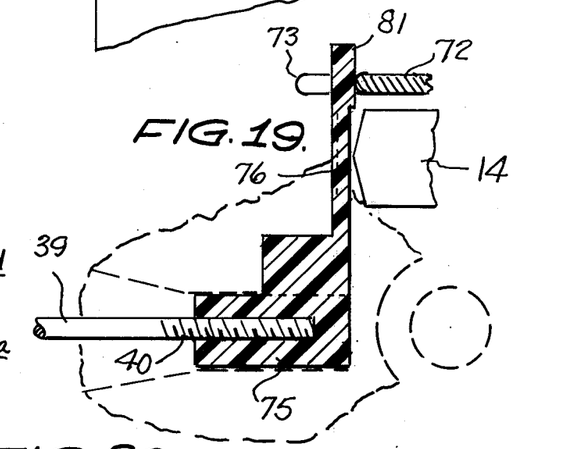
FIG. 19 is a cross-sectional view of the alignment tool illustrated in FIG. 18 and taken along line 19—19 thereof looking in the direction of the arrows.

Referring now to FIGS. 17 through 19, a still further service head which may be utilized with the kit of the present invention is indicated generally by reference numeral 70 and comprises a visual alignment gauge to assist in checking the angular (azimuth) and vertical alignment of the tape playback head 14. Indicated in FIG. 17 is a conventional tape guide 72 which, in a common construction, is rigidly affixed to the sensing poles 15 and 15a by means of a transverse support bracket 71. Tape guide 72 is a substantially planar plate which is positioned perpendicularly to the support bracket 71. Tape guide 72 conventionally includes a pair of bifurcated tips 73 and 74 (FIG. 18) between which the Mylar or other conventional recording tape normally passes.

The alignment gauge 70 includes a support base 75 which is also tapped in one end thereof to receive the threaded end 40 of shaft 39 of the tool holder. Base 75 is also sized similarly to base 61 so as to be guided and securely positioned by guideways 18a and 18b of cartridge case 10. Extending laterally from the base 75, and perhaps molded integrally therewith, is a plate 36 which extends over playback head 14 and is preferably transparent so as to permit visual observation of the magnetic pickups 81 and 82 of head 14 therethrough. The transparent plate 76 has preformed thereon a plurality of indicia 77, 78, 79 and 80 for checking the alignment of the pickups 81 and 82, and hence that of magnetic head 14. As an alternative to the rectangular configuration of indicia 77, 78, 79 and 80, such indicia may be provided as a plurality of horizontally or vertically disposed lines, or the like.

At the free end of plate 76 is formed a support tab 81 which is sized to fit between the bifurcated tips 73 and 74 of the tape guide 72 to provide additional support and proper alignment for the gauge 70. As stated hereinabove, the other end of plate 76 is supported in proper alignment by means of the base 75 fitting within guideways 18a and 18b. In the event that it becomes necessary for the serviceman to release handle 41 of the head holding tool, an additional shaft support member 82 may be provided for guiding along shaft 39. Tool 82 serves the function of stabilizing the tool holder and thereby increasing the accuracy of the visual alignment test.

Referring now to FIGS. 2, 3, 4, 12, 13, 14 and 17, the operation of the preferred embodiments of the present invention will now be described. Hollow tape cartridge case 10 is inserted in slot 11a so that a cut-out portion 33 in rear wall 10c of cartridge casing 10 surrounds capstan 13, a cut-out portion 34 surrounds playback head 14 and a cut-out portion 35 surrounds sensing poles 15 and 15a. Lock spring 16 and pressure roller 17 retain the cartridge casing in place in a well-known manner and the insertion of the cartridge case 10 in slot 11a activates the unit by depression of a microswitch (not shown) in a conventional fashion. With the unit thus actuated, flywheel 12 will drive capstan 13 causing it to rotate. At this point, the user of the kit may observe the rotating capstan 13 through the opening in the front wall 10f of hollow cartridge case 10 and may similarly observe sensing poles 15 and 15a and playback head 14. A decision will then be made as to whether these various parts need cleaning.

If it is observed that the capstan has broken Mylar tape or the like wrapped about its outer surface, the cutter head 60 is selected and may be secured either to shaft 39 of tool holder 41, or shaft 27 of tool holder 21 via adapter 42, in the manner described more fully hereinabove. The selected tool holder is then inserted through the opening in the front wall 10f along parallel trackways 18a and 18b which are directly aligned with capstan 13, as shown in FIG. 14. Base 61 is so dimensioned that it will securely fit between trackways 18a and 18b to unerringly guide the edges 65 and 66 of blades 63 and 64 into contact with the outer surface of capstan 33. The blades 63 and 64 will remove any cuttings which have adhered to the outer surface of capstan 33, and such cuttings will be attracted to and held by magnet 67 to permit easy removal thereof from the unit. This procedure may be repeated as necessary until capstan 33 is free of such cuttings.

Figure 2:
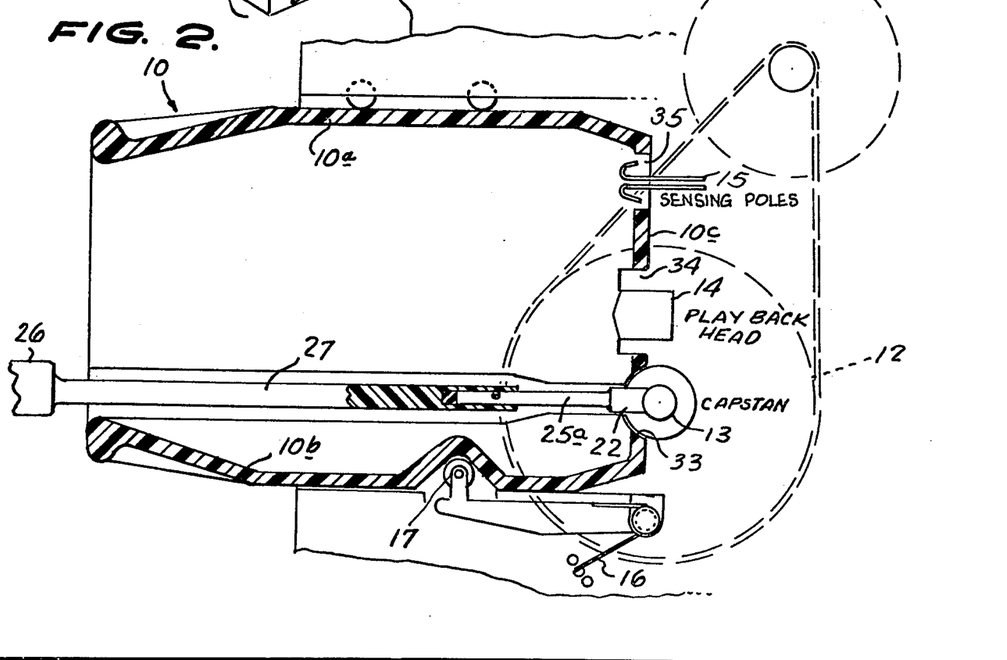
FIG. 2 is a sectional view showing the hollow cartridge of the present invention inserted in the playback unit with a mounting tool having a service head positioned for cleaning the drive capstan.

Abrasive cleaning head 22 may then be locked to tool holder 21 in the manner described hereinabove. The tool is then inserted through the opening in front wall 10f along parallel trackways 18a and 18b, as shown in FIG. 2. Abrasive honing head 22 is also dimensioned to securely fit between trackways 18a and 18b and therefore be unerringly guided into intimate contact with the surface of capstan 13.

After the honing operation has been performed for approximately 10 seconds, tool holder 21 is removed from trackways 18a and 18b, abrasive cleaning head 22 is replaced by felt cleaning head 23, which may be dipped in methyl alcohol or the like, and the above-described operation is repeated, this time to remove all remaining foreign matter from the surface of the capstan.

In order to clean the playback head 14 and the sensing poles 15 and 15a, as illustrated in FIG. 3, tool holder 21 is fitted with swab cleaning head 24 which may be dipped in methyl alcohol or the like, the tool is inserted through the opening in the front wall 10f of hollow cartridge case 10 and the surfaces of these components may be cleaned.

At this point, the major components of the playback unit have been thoroughly and properly cleaned, and as part of a normal maintenance checkup, the operation of the sensing poles may be tested and the alignment of the playback head may be checked. To this end, with the hollow cartridge case 10 still in place in the playback unit 11, the manual program changer button (not shown) of the unit may be actuated and the playback head 14 may be visually observed to ensure that it properly changes from one track to another in response to the actuation of the program changer button. For example, in an 8-track tape player unit, the playback head 14 would shift between four different heights or program positions.

After it has been observed that the playback head 14 is properly shifting in response to the actuation of the manual program changer button (not shown), it is desirable to test the operation of the sensing poles 15 and 15a which are normally shunted by a small metal strip at the end of a tape being played. Shorting of sensing poles 15 and 15a conventionally actuates a solenoid to shift the playback head 14 to the next adjacent track. To test the foregoing for proper operation, the program changing probe 50 of FIG. 11 is selected and is secured to the desired mounting tool. The probe 50 is inserted through the hollow cartridge case 10 so as to momentarily touch the poles 15 and 15a and thereby electrically short same together, as seen in FIG. 12, which should then result in a shifting of the playback head 14. This shunting operation may be repeated as often as necessary to ensure proper operation, and is helpful in detecting and isolating any malfunctions without requiring dismantling of the playback unit.

The service kit of the present invention also permits the alignment of the playback head 14 to be checked without requiring dismantling of the unit. To this end, the additional service head 70 which comprises an alignment gauge is selected and is mounted to the desired tool holder. As illustrated in FIGS. 17 and 19, the base 75 of the alignment gauge 70 is guided and held in position by trackways 18a and 18b to maintain one end of the transparent plate 76 in proper position, while the other end thereof is maintained in proper position by placement of tab 81 between the bifurcated tips 73 and 74 of tape guide 72. It is clearly quite important that indicia 77, 78, 79 and 80 be properly positioned in front of playback head 14 to allow an accurate reading to be made, and provision of the double ended support means for the transparent plate 76 ensures same.

If any misalignment of playback head 14 is observed, such that, for example, magnetic pickups 81 and 82 are not parallel with indicia 78 and 80, respectively, the decision may then be made to remove the chassis of the playback unit to properly align the playback head 14. The alignment gauge 70 of the present invention may be used after the chassis is removed to make the necessary adjustments to correct both playback head azimuth and height for proper tracking. The latter adjustments may have to be performed by a skilled technician.

If, at any point during the above-described alignment testing or correcting process, the serviceman requires the use of both hands, the tool holder may be supported in trackways 18a and 18b by means of the auxiliary support member 82.

Turning now to FIG. 10, an auxiliary feature of the present invention, which permits the person servicing the tape playback unit 11 to measure the tension on the cartridge, is illustrated. As is well-known, the cartridge is retained in place by the pressure exerted through pressure roller 17 and lock spring 16. From time to time this pressure changes and must be adjusted so that the cartridge does not bear too heavily against playback head 14 and capstan 13. In order to measure the existing pressure on the cartridge, peg 31 is inserted in apertures 30a and 30b and the hollow cartridge 10 is inserted in place, as above-described. Spring scale 32 may then be hooked around peg 31 and the scale pulled in the direction of the arrow in FIG. 10. A reading may then be visually taken from spring scale 32 at the instant when pressure roller 17 disengages from hollow cartridge case 10 and the cartridge comes loose. This will provide an indication of the actual pressure exerted on a tape cartridge when it is inserted in the playback unit. If the pressure is too large or too great, it may be adjusted in a conventional manner by changing the position of lock spring 16 through an adjustment hole (not shown).

It will be understood that while the invention has been described hereinabove by way of an illustrative embodiment adapted to an 8-track cartridge, the invention is not so limited. Of course, the present invention may be adapted for use with any magnetic tape cartridge configuration, including cassettes and 4-track systems, currently available commercially. While the present invention has set forth six specific servicing tools, it will be apparent that other servicing tools, including cleaning tools, repair tools, or the like, are within the contemplation of the present invention.

While a particular embodiment of the present invention has been shown and described, it will be appreciated by those skilled in the art that changes and modifications may be made therein without departing from the true spirit and scope of the invention which is defined in the claims appended hereinbelow.

I claim as my invention:

1. A kit adapted to be used with a cartridge tape playback unit having a plurality of components which may need servicing and including an opening for receiving a cartridge enclosed tape, which comprises:
   a hollow cartridge case having a substantially open front end for providing unobstructed viewing of said components when said cartridge case is inserted in said opening;
   separate, non-affixed tool holder means for mounting at least one service head for servicing at least one of said components; and
   access means in the rear end of said cartridge case for permitting said tool holder means to pass through said cartridge case from said open front end and selectively service said at least one of said components.

2. A kit as set forth in claim 1, wherein said at least one of said components comprises a rotating drive capstan, and said at least one service head comprises cutter means for removing foreign matter from said rotating drive capstan.

3. A kit as set forth in claim 2, wherein said cutter means comprises blade means having a cutting edge extending parallel with the rotational axis of said capstan and adapted to be placed in contact with the outer surface thereof for removing pieces of magnetic tape therefrom during rotation thereof.

4. A kit as set forth in claim 3, wherein said blade means comprise a pair of substantially planar, parallel blades whose respective cutting edges are parallel with said axis, and further comprising magnet means positioned on said service head for attracting said pieces of magnetic tape removed by said cutter means.

5. A kit as set forth in claim 1, wherein said at least one of said components comprises a pair of sensing poles, and said at least one service head comprises probe means for shunting said pair of sensing poles together.

6. A kit as set forth in claim 5, wherein another of said components comprises magnetic playback head means shiftable through a plurality of positions so as to enable playback of a plurality of different tracks on a magnetic tape, said pair of sensing poles serving, when shunted, to shift said head whereby said probe means permits visual inspection through said cartridge case of the shifting operation of said playback head.

7. A kit as set forth in claim 5, wherein said pair of sensing poles comprise a pair of spaced, parallel terminals separated by insulation and wherein said probe means comprises a metallic tip for electrically connecting said pair of terminals together.

8. A kit as set forth in claim 1, wherein said at least one of said components comprises a playback head having magnetic pickup means thereon and which may be adjusted in both azimuth and height with respect to the magnetic tape played back thereby, and wherein said at least one service head comprises means for checking the alignment of said playback head.

9. A kit as set forth in claim 8, wherein said means for checking the alignment comprises transparent plate means adapted to be positioned adjacent said playback head and having alignment indicia means formed thereon for permitting visual observation of said magnetic pickup means therethrough.

10. A kit as set forth in claim 9, wherein another of said components comprises guide means positioned adjacent said playback head for normally guiding said magnetic tape, and wherein said at least one service head includes support means which may be coupled to said guide means for properly positioning said transparent plate means.

11. A kit as set forth in claim 10, wherein said guide means comprises a bifurcated tip forming a guide slot through which said magnetic tape normally passes, and wherein said support means comprises a tab extending from one end of said transparent plate means and adapted to fit in said guide slot.

12. A kit as set forth in claim 11, wherein said hollow cartridge case further includes side walls and trackway means provided on the interior of said side walls for guiding said at least one service head into proper position adjacent said playback head.

13. A kit as set forth in claim 12, wherein said at least one service head includes a base member to which is attached the other end of said transparent plate means.

14. A kit as set forth in claim 13, wherein another of said components comprises a rotating drive capstan positioned on the side of said playback head that is opposite to the side on which is positioned said guide slot, said trackway means adapted to be in substantial alignment with said capstan when said cartridge case is positioned in said playback unit.

15. A kit as set forth in claim 14, wherein said tool holder means further includes a shaft and means positioned on said shaft and sized to fit within said trackway means for further supporting said tool holder means therewithin.

16. A kit adapted to be used with a cartridge tape playback unit having a plurality of components which may need servicing and including an opening for receiving a cartridge enclosed tape, which comprises:
a hollow cartridge case having a substantially open front end for providing unobstructed viewing of said components when said cartridge case is inserted in said opening;
separate, non-affixed tool holder means for individually and separately mounting one of a plurality of service head means for servicing said components, said service head means including at least one service head not used for cleaning said components; and
access means in the rear end of said cartridge case for permitting said tool holder means to pass through said cartridge case from said open front end and selectively service at least one of said components.

17. A kit as set forth in claim 16, wherein said components include a playback head and said at least one service head not used for cleaning said components comprises means for checking the alignment of said playback head.

18. A kit as set forth in claim 17, wherein said playback head includes magnetic pickup means thereon and which may be adjusted in both azimuth and height and wherein said means for checking the alignment comprises transparent plate means adapted to be positioned adjacent said playback head and having alignment indicia means formed thereon for permitting visual observation of said magnetic pickup means therethrough.

19. A kit as set forth in claim 17, wherein said service head means further includes another service head not used for cleaning said components.

20. A kit as set forth in claim 19, wherein said components include a pair of sensing poles and said another service head comprises probe means for shunting said pair of sensing poles together.

21. A kit as set forth in claim 20, wherein said pair of sensing poles comprise a pair of spaced, parallel terminals separated by insulation and wherein said probe means comprises a metallic tip for electrically connecting said pair of terminals together.

22. A kit as set forth in claim 20, wherein said service head means further includes a cleaning service head for cleaning said at least one of said components.

23. A kit as set forth in claim 22, wherein said at least one of said components comprises a rotating drive capstan, and said cleaning service head comprises cutter means for removing foreign matter from said rotating capstan.

24. A kit as set forth in claim 23, wherein said cutter means comprises blade means having a cutting edge extending parallel with the rotational axis of said capstan and in contact with the outer surface thereof for removing pieces of magnetic tape therefrom during rotation thereof.

25. A kit as set forth in claim 24, wherein said blade means comprise a pair of substantially planar, parallel blades whose respective cutting edges are parallel with said axis, and further comprising magnet means positioned on said service head for attracting said pieces of magnetic tape removed by said cutter means.

26. A kit for servicing the components of a cartridge playback unit having a rotating drive capstan and an opening for receiving a cartridge enclosed tape, comprising:
 a hollow cartridge case having a substantially open front end for providing unobstructed viewing of said components when said cartridge case is inserted in said opening;
 separate, non-affixed tool holder means for mounting cutter means for removing foreign matter from said rotating capstan; and
 access means in the rear end of said cartridge case for permitting said tool holder means to pass through said cartridge case from said open front end and selectively engage said rotating capstan.

27. A kit as set forth in claim 26, wherein said cutter means comprises blade means having a cutting edge extending parallel with the rotational axis of said capstan and in contact with the outer surface thereof for removing pieces of magnetic tape therefrom during rotation thereof.

28. A kit as set forth in claim 27, wherein said blade means comprise a pair of substantially planar, parallel blades whose respective cutting edges are parallel with said axis, and further comprising magnet means positioned on said tool holder means for attracting said pieces of magnetic tape removed by said cutter means.

29. A kit for servicing the components of a cartridge tape playback unit having a pair of sensing poles and an opening for receiving a cartridge enclosed tape, comprising:
 a hollow cartridge case having a substantially open front end for providing unobstructed viewing of said components when said cartridge case is inserted in said opening;
 separate, non-affixed tool holder means for mounting probe means for shunting said pair of sensing poles together; and
 access means in the rear end of said cartridge case for permitting said tool holder means to pass through said cartridge case from said open front end and selectively engage said sensing poles.

30. A kit as set forth in claim 29, wherein another of said components comprises magnetic playback head means shiftable through a plurality of positions so as to enable playback of a plurality of different tracks on a magnetic tape, said pair of sensing poles serving, when shunted, to shift said head whereby said probe means permits visual inspection through said cartridge case of the shifting operation of said playback head.

31. A kit as set forth in claim 29, wherein said pair of sensing poles comprise a pair of spaced, parallel terminals separated by insulation and wherein said probe means comprises a metallic tip for electrically connecting said pair of terminals together.

32. A kit for servicing the components of a cartridge tape playback unit having a playback head with magnetic pickup means thereon which may be adjusted in both azimuth and height, and an opening for receiving a cartridge enclosed tape, comprising:
 a hollow cartridge case having a substantially open front end for providing unobstructed viewing of said components when said cartridge case is inserted in said opening;
 separate, non-affixed tool holder means for mounting means for checking the alignment of said playback head; and
 access means in the rear end of said cartridge case for permitting said tool holder means to pass through said cartridge case from said open front end.

33. A kit as set forth in claim 32, wherein said means for checking the alignment comprises transparent plate means adapted to be positioned adjacent said playback head and having alignment indicia means formed thereon for permitting visual observation of said magnetic pickup means therethrough.

34. A kit as set forth in claim 33, wherein another of said components comprises guide means positioned adjacent said playback head for normally guiding said magnetic tape, and wherein said means for checking the alignment includes support means which may be coupled to said guide means for properly positioning said transparent plate means.

35. A kit as set forth in claim 34, wherein said guide means comprises a bifurcated tip forming a guide slot through which said magnetic tape normally passes, and wherein said support means comprises a tab extending from one end of said transparent plate means and adapted to fit in said guide slot.

36. A kit as set forth in claim 35, wherein said hollow cartridge case further includes side walls and trackway means provided on the interior of said side walls for guiding said means for checking the alignment into proper position adjacent said playback head.

37. A kit as set forth in claim 36, wherein said means for checking the alignment includes a base member to which is attached the other end of said transparent plate means.

38. A kit as set forth in claim 37, wherein another of said components comprises a rotating drive capstan positioned on the side of said playback head that is opposite to the side on which is positioned said guide slot, said trackway means adapted to be in substantial alignment with said capstan when said cartridge case is positioned in said playback unit.

39. A kit as set forth in claim 38, wherein said tool holder means further includes a shaft and means positioned on said shaft and sized to fit within said trackway means for further supporting said tool holder means therewithin.

* * * * *